(No Model.) 2 Sheets—Sheet 1.
E. K. HILL.
VALVE MECHANISM FOR STEAM ENGINES.
No. 450,866. Patented Apr. 21, 1891.
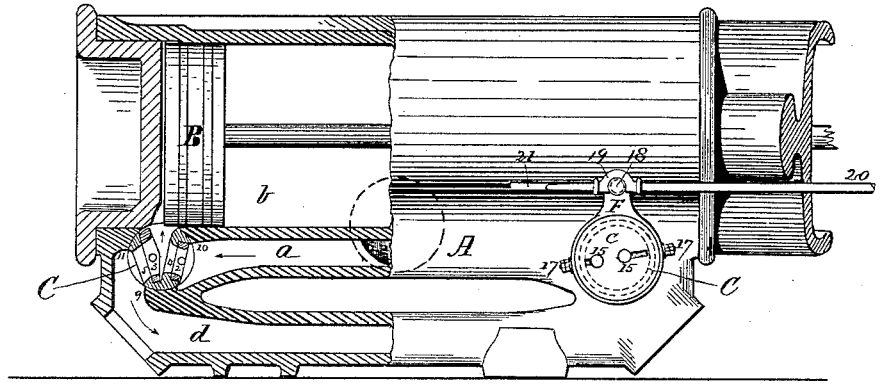
Fig. 1.
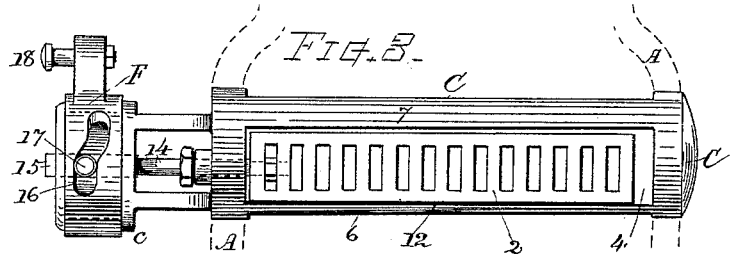
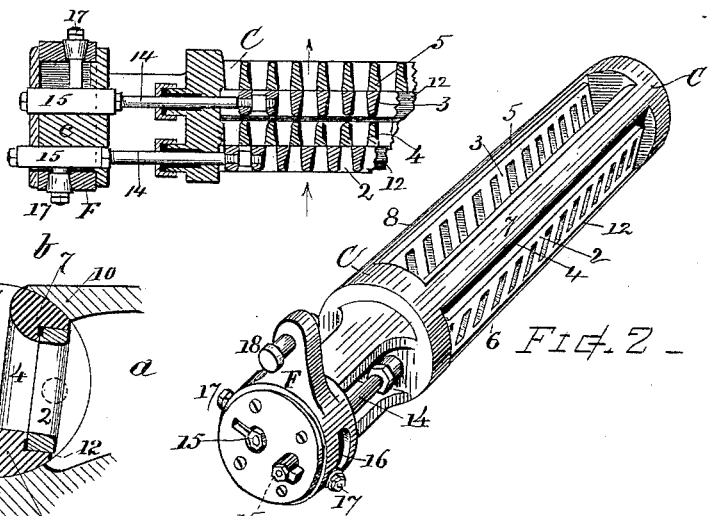
Witnesses.
Inventor.
Edward K. Hill
By Chas. H. Burleigh
Attorney

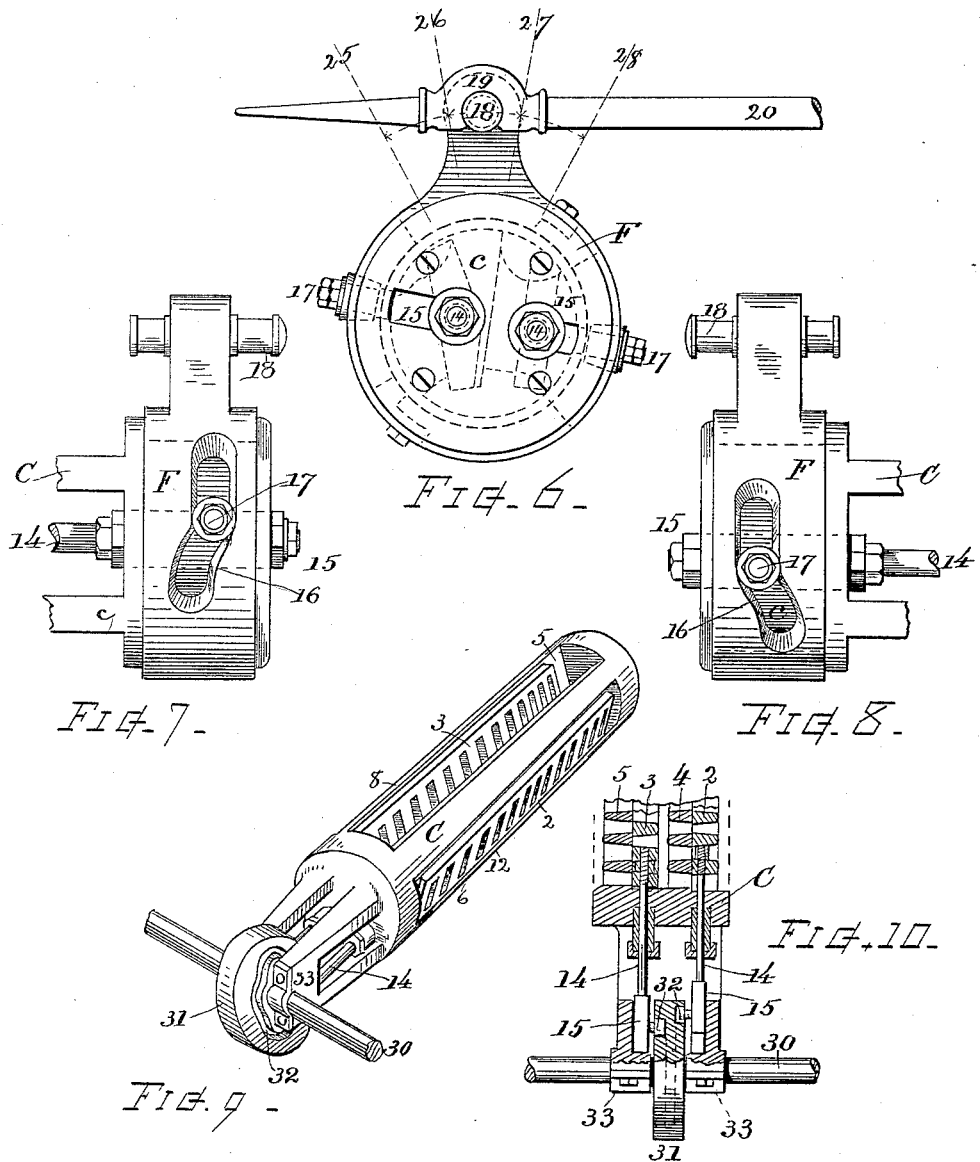

UNITED STATES PATENT OFFICE.

EDWARD K. HILL, OF WORCESTER, MASSACHUSETTS.

VALVE MECHANISM FOR STEAM-ENGINES.

SPECIFICATION forming part of Letters Patent No. 450,866, dated April 21, 1891.

Application filed November 29, 1889. Serial No. 332,059. (No model.)

*To all whom it may concern:*

Be it known that I, EDWARD K. HILL, a citizen of the United States, residing at Worcester, in the county of Worcester and State of Massachusetts, have invented certain new and useful Improvements in Valve Mechanism for Steam-Engines, of which the following, together with the accompanying drawings, is a specification sufficiently full, clear, and exact to enable persons skilled in the art to which this invention appertains to make and use the same.

This invention relates to improvements in that class of engine-valves set forth in Letters Patent No. 326,820, dated September 22, 1885, wherein the valve is combined with a skeletonized plug, carrier, or seat-frame which is fitted and introduced within a circular opening through the cylinder-casting, the objects of my present invention being, first, to afford a more compact, economical, and efficient structure, and to reduce the amount of clearance-space required between the valves and piston at the ends of the cylinder-chamber; second, to provide a simple and efficient mechanism for working the valves when arranged in the improved manner set forth, and, third, to provide a gridiron steam-inlet valve and gridiron exhaust-valve, both supported on guideways within the circle of a double-seated plug having transverse ports and severally working in longitudinal direction, in combination with means for imparting motion to the valves from a rocker or cam device at the exterior, actuated by the eccentric-rod or a shaft connected with the engine mechanism. These objects I attain by mechanism, such as explained in the following description, the particular subject-matter claimed being hereinafter definitely specified:

In the drawings, Figure 1 is a part side, part sectional view of an engine-cylinder and valves, illustrating the nature of my invention. Fig. 2 is a perspective view showing separate from the cylinder the skeletonized plug or valve-seat frame with the inlet-valve and exhaust-valve. Fig. 3 is a side view of the same. Fig. 4 is a horizontal section through one end of the skeletonized plug, valves, and valve-operating devices. Fig. 5 is a transverse section through the valves and valve-seats. Fig. 6 is a front end view of the valve-operating mechanism. Fig. 7 is a side view of the rocker, showing its cam or groove for working the exhaust-valve. Fig. 8 is an opposite side view of the same, showing its cam or groove for working the steam-inlet valve. Figs. 9 and 10 show a modification in the cam mechanism or operating parts adapted for engines wherein a rotating shaft is employed instead of an eccentric and rod for imparting movement to the valve mechanism.

Referring to parts, A denotes the cylinder-casting containing the steam-chest $a$, the cylinder proper or piston-chamber $b$, and exhaust-chamber $d$, arranged substantially as shown or in well-known manner.

B indicates the piston, which works back and forth in the chamber $b$, and is connected in the usual manner with the crank, shaft, fly-wheel, and eccentric mechanisms, which parts, being well known, are not herein shown.

C indicates a double-seated skeletonized plug or valve supporter, one of which is introduced at each end of the cylinder transversely between the steam-chest, piston-chamber, and exhaust-chamber, and fitted in a properly-formed opening in the cylinder-casting, its projecting end having supported thereon the mechanism for operating the valves. These parts are of improved construction in accordance with my invention and best arranged in the manner here described.

The inlet-valve 2 and the exhaust-valve 3 are both arranged in a single skeletonized plug or carrier C, which latter is made with two partitions or seats 4 and 5, each having a series of ports therethrough for the passage of steam, which ports are opened and closed by the respective valves 2 and 3. Said seats and valves are relatively disposed within the plug in such manner that when the plug is inserted at its position in the cylinder-casting the seats and valves will stand as barriers between the steam-chest and piston-chamber, and the piston-chamber and exhaust-chamber in proper position for controlling the flow of steam to and from the cylinder or piston-chamber. This skeletonized plug, which has solid transverse ends or walls to fit the cylinder-opening, is best made circular and slightly tapered, is formed with three rib portions 6, 7, and 8, that extend from end to end thereof and make close joints at the periphery with the cylinder-casting, the bottom 6 matching with the division-wall 9 between the steam-chest and exhaust-chambers, and the other two ribs 7 and 8 matching with the parts of the cylinder 10 and 11 at front and rear of the passage leading thereinto. The partitions or bars of the valve-seats 4 and 5 extend upward from the bottom part 6 in somewhat of a V form, or oppositely inclined, and respectively join with the top rib portions 7 and 8, as shown in Fig. 5. The valve-seats 4 and 5 are furnished with a series of narrow ports at short intervals apart, and disposed with their longest dimension in a direction transverse to the longitudinal dimension of the plug or seat frame, and the rib 6 below the seats are best formed with guideways 12, on which the edge of the valves are supported and guided as they move back and forth. Rods or stems 14 are connected to the respective valves and extend through the head of the plug to the exterior, suitable suitable stuffing-boxes being provided therefor.

Projecting from the end of the plug C there is a support or bearing c, having guides therein for the heads 15 of the valve-stems 14, and mounted thereon is a ring or rocker F, provided with cams or slots 16, that engage with lugs or arms 17, fixed to the heads 15 of the valve-stems, and by means of said cams and arms the valve-stems, together with the valves, are moved in one direction and the other as the rocker is oscillated. The rocker F has a projection or crank carrying a wrist-pin 18, on which the hook 19 of the eccentric-rod 20 engages for moving the rocker and working the valves in unison with the revolutions of the engine-shaft. Any other suitable connection can be used in lieu of the eccentric-rod for imparting equivalent action to the rocker or cams for working the valve-stems 14. The heads 15 of the valve-stems are best made square or with splines or projecting ribs, so that they cannot rotate in their guiding-bearings, and the actuating lugs or arms 17 are best provided with anti-friction rolls, as indicated in Fig. 6.

The skeletonized plug, valves, and valve-actuating devices for the two ends of the engine-cylinder are constructed and arranged to operate in the same manner, but in right and left order. The crank-pin 18 of the two rockers F are best connected one with the other by a link or rod 21 to move in unison, and the eccentric-rod 20 is hooked onto one of the crank-pins of the first rocker for giving motion.

The form of the cam-surfaces can be modified as may be required to impart the peculiar quality of movement desired in any particular case, or so as to open or close the valves sooner or later in their relative order of action.

In the operation the rocker F is oscillated or moved back and forth by the action of the eccentric-rod 20, the radial of the rocker swinging through an arc; (indicated by the lines 25, 26, 27, and 28 in Fig. 6.) The cam-surfaces 16, which work the valve devices, are so formed and proportioned that during that part of the movement included between lines 25 and 26 the steam-inlet valve will be open and the exhaust closed. During that part of the movement included between the lines 27 and 28 the exhaust will be open and the steam-inlet closed, and in that part included between lines 26 and 27 both valves will be closed, but making that part of their shift on the lap of the valve.

Among the advantages incident to my invention may be mentioned its economy and facility of structure. The two valves are brought into close proximity to the end of the cylinder-chamber as well as to each other, thereby reducing the clearance-space to a comparatively small minimum, thus avoiding loss of steam and insuring more economical working. Other advantages are the simplicity and compactness of structure and ease of operation, the valves requiring but a short movement and the operating parts being strong and simple, insuring great durability and wearing capacity in the apparatus when in use.

By disposing the bars and ports of the valve-seats transverse to the longitudinal axis of the skeletonized plug and arranging the valves to move longitudinally in their guideways thereon a very compact and desirable system of valves is afforded.

In Figs. 9 and 10 I have shown a revolving shaft 30 in place of a reciprocating eccentric-rod for working the valve-actuating cam, which latter is made as a groove 32 in the side of a revolving disk or wheel 31, said shaft supported in the bearings 33 on the skeletonized plug, and the parts being arranged in a manner that will cause the valve-stems to be moved in and out as the shaft and cam are rotated.

I claim as my invention herein to be secured by Letters Patent—

1. The combination, with the engine-cylinder, of the skeletonized plug having two valve-seats with transversely-disposed ports or openings therethrough, a longitudinally-movable inlet-valve and exhaust-valve, operating-stems respectively attached to said valves and extending through the end of the plug to the exterior, and means for imparting endwise reciprocating movement to said valve-stems and valves, substantially as set forth.

2. The combination of the skeletonized plug having the two series of ports and valve-seats arranged therein, the two endwise-movable valves arranged within the circumferential line of the plug or carrier, the valve-stems connected with the respective valves and extending through the end of the plug and having engaging lugs or arms, an oscillating or rotating cam that engages with said lugs for operating the valve-stems, and an actuating connection for imparting motion to said cam from the moving part of the engine, as set forth.

3. The combination, substantially as described, of the engine-cylinder, the skeleton plug provided with the externally-projecting bearing-head and having internal partitions with ports and seats for the valves, the steam-inlet valve, and the exhaust-valve arranged to slide on said seats, stems attached to the respective valves and having heads furnished with lateral lugs or arms that are supported and guided in said bearing-head, the rocker mounted on said bearing-head, having cams or slots that engage the valve-stem arms, and the projecting arm and wrist-pin adapted for connection with the hook of the eccentric rod or link, whereby oscillative motion is imparted to the rocker, as set forth.

4. The cylinder-casting provided with supporting-surfaces, as at 9, 10, and 11, in combination with a removable valve-seat structure having bars, as at 6, 7, and 8, fitted to match the said surfaces on the cylinder-casting and provided with perforated partitions having seats for supporting sliding valves between the bar 6 and the respective bars 7 and 8, that extend from end to end longitudinally of the structure and terminate in transverse end walls that fit the openings in the cylinder-casting, as and for the purpose described.

5. The skeletonized plug provided with two seats for the inlet-valve and for the exhaust-valve, severally disposed in upright or slightly-inclined planes and having longitudinal ledges or guideways at 12, whereon the side of the valve is sustained and slides, in combination with the engine-cylinder valves and valve-actuating mechanism, substantially as set forth.

Witness my hand this 27th day of November, A. D. 1889.

EDWARD K. HILL.

Witnesses:
CHAS. H. BURLEIGH,
ELLA P. BLENUS.